Oct. 18, 1966 G. B. WALKER 3,279,848
CHILD'S CAR SEAT
Filed May 3, 1965
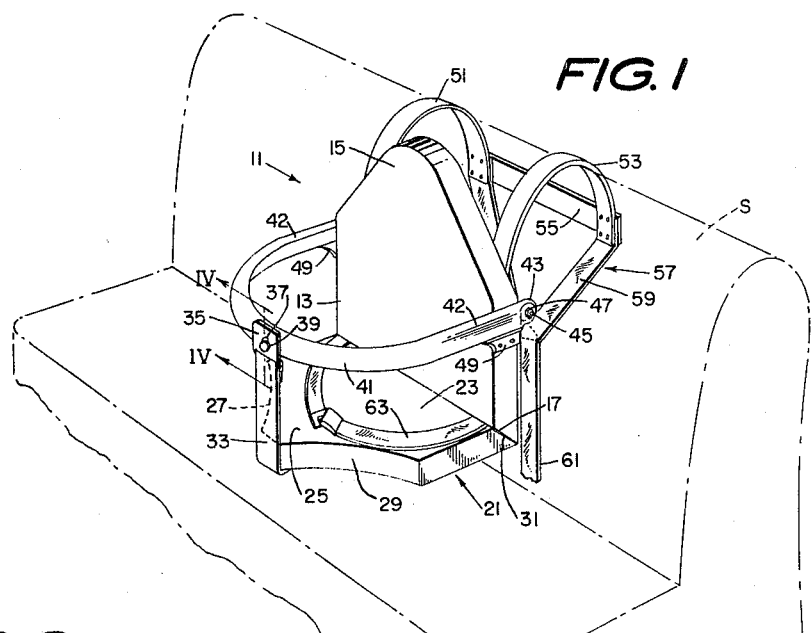
FIG. 1
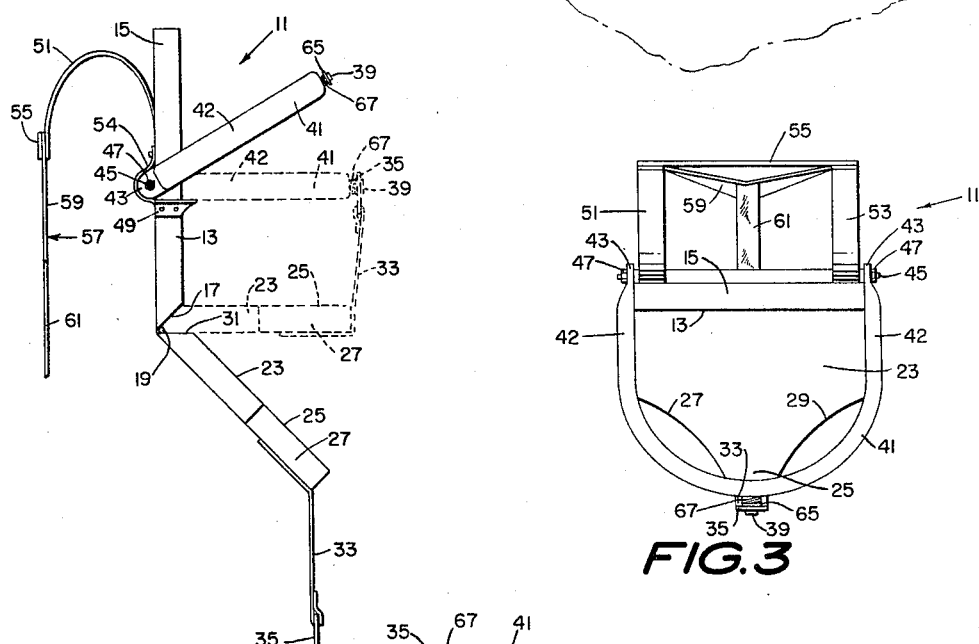
FIG. 2
FIG. 3
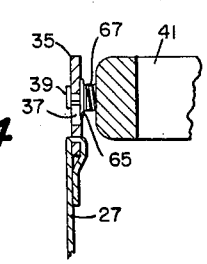
FIG. 4
INVENTOR,
GEORGE B. WALKER
BY
Weatherford & Weatherford
Attys

United States Patent Office 3,279,848
Patented Oct. 18, 1966

3,279,848
CHILD'S CAR SEAT
George B. Walker, Rte. 2, Box 557, Itta Bena, Miss.
Filed May 3, 1965, Ser. No. 452,605
1 Claim. (Cl. 297—256)

This invention relates to new and useful improvements in auxiliary car seats and more particularly to children's car seats.

There have been heretofore numerous car seats adapted for use by children and infants; however, none of these prior devices have provided a combination of safety features, easy attachability and construction designed for the comfort of the user. None of these prior children's car seats have provided construction means incorporating additional safety features to minimize the bodily harm induced by accident or collision.

The principal object of the present invention is to provide a child's car seat adapted for use in an automobile.

A further object of the present invention is to provide a child's car seat having an anchorable safety harness.

Another object of the present invention is to provide a child's car seat having an upwardly extending headrest for protection against whiplash in the event of accident.

Another object of the present invention is to provide a child's car seat having arcuately formed seat portions for the comfort and safety of the user.

A further object of the present invention is to provide a child's car seat having locking strap means for the attachment of the seat portion to the arm rest.

Another object of the present invention is to provide a child's car seat having a hinged seat portion for easy accessibility; and Another object of the present invention is to generally improve the design, construction and efficiency of children's car seats.

The means by which the foregoing and other objects of the present invention are accomplished and the manner of their accomplishment will be readily understood from the following specification upon reference to the accompanying drawings, in which:

FIG. 1 is a perspective view of the device of the present invention.

FIG. 2 is a side elevational view of the device of FIG. 1 in opened condition with the closed position indicated by dotted lines.

FIG. 3 is a top plan view of the device of FIG. 2.

FIG. 4 is a cross sectional view of a portion of the device of FIG. 1 taken as on the line IV—IV of FIG. 1.

Referring now to the drawings in which the various parts are indicated by numerals, the embodiment of the present invention comprises a child's car seat 11 provided with a padded substantially upright backrest 13 having an integrally attached upwardly extending contoured headrest portion 15 and an angularly bevelled base portion 17.

The car seat 11 is further provided with hinge means 19 rigidly attached to and co-extensive in length with the bevelled base portion 17 and a padded seat 21. The seat 21 comprises a central body supporting section 23, a forwardly extending substantially centrally disposed tongue 25 defined by a pair of diverging arcuate faces 27, 29 provided for the positioning of the legs of the user of the device. The seat 21 is further provided with a substantially angular tail section 31 co-extensive in length with the width of the seat 21 and the bevelled base portion 17 of the backrest 13. The seat 21 is hingedly connected to the backrest 13 by the aforedescribed hinge means 19. It will thus be readily seen upon reference to the drawings, and more particularly to FIG. 2 of the drawings, that when the car seat 11 is in closed position the bevelled base portion 17 of the backrest 13 and the angular tail section 31 of the body supporting section 23 of the seat 21 are in mating abutment to form a substantially right angular construction.

The tongue 25 of the seat 21 is provided at its forward end with a flexible strap 33 rigidly attached to the undersurface of the tongue 25 and extends forwardly around the tip of the tongue 25 and upwardly therefrom. A substantially flat latch plate 35, carried by the upper distal end of the flexible strap 33, is provided with a dual diameter, centrally disposed slot 37 for releasable attachment with a capped stud 39 carried by the semi-elliptical guard rail 41. The guard rail 41 further comprises a pair of oppositely spaced, rearwardly extending arms 42 and a pair of somewhat flattened ends 43. The ends 43 are provided with centrally disposed holes for the swingable attachment of the guard rail 41 on a shaft 45 laterally disposed and supported by the mid-section of the backrest 13. The shaft 45 is additionally provided with threaded ends and suitable fastening means 47 to further maintain the guard rail in substantially pivotal condition on the shaft 45 relative to the car seat 11. The present invention further comprises a pair of oppositely spaced supports 49 affixed to the periphery of the backrest 13 somewhat below the headrest portion 15 and the shaft 45 for supporting the guard rail 41 and maintaining the guard rail 41 in substantial right angular position relative to the backrest 13 when the guard rail 41 is in closed condition.

The backrest 13 is further provided with a pair of substantially semi-elliptical hooks 51, 53, as best shown in FIG. 1 of the drawings, curvingly designed and adapted for use with an automobile seat S. The ends of the hooks 51, 53 are anchored within the covering material of the rearward surface of the backrest 13 to the internal frame of the car seat 11 to permit the hooks 51, 53 to arcuately overlie the upstanding back portion of the automobile seat S and suspend therefrom the attached child's car seat 11. Each of hooks 51, 53 is provided with a bracket 54, shaft 45 passing through and being additionally supported by brackets 54. The hooks 51, 53 are further maintained in substantial rigid alinement by means of attachment to a spacer bar 55 connected to and spanning between the rearmost ends of the hooks 51, 53. A safety belt 57 comprising a Y-shaped harness 59 attached to the hooks 51, 53 at their rearmost ends and interposed between the hook ends and the spacer bar 55, and a depending belt portion 61 is provided to anchor the car seat 11 securely to the automobile seat S. The lower distal end of the belt portion 61 (not shown) may be connected to conventional safety belt attachment means on the floor of the automobile. Seat belt means 63 are provided to further restrain the user within the child's car seat 11.

It will, therefore, be seen readily upon reference to the drawings, that in use the device hereinabove described is affixed to the back portion of an automobile seat S by positioning the hooks 51, 53 thereon and connecting the lowermost end of the belt portion 61 to a suitable fastening means on the automobile floor. The guard rail 41 is raised to permit the user of the device to be placed therein. The guard rail 41 is allowed to return to its use position to rest on the supports 49 and the seat 21 is hingedly positioned to allow the latch plate 35 to make locking contact with the stud 39 carried by the guard rail 41.

The latch plate 35 is placed over the stud 39 and moved downwardly to permit the smaller bore of the slot 37 to embracingly contact the shank of the stud 39. A perforate disc 65 carried by the stud 39 and urged thereagainst by a spring 67 is provided to further maintain the latch plate 35 interposed between the head of the stud 39 and the washer 65, in latching attachment with the guard rail 41.

I claim:

A child's car seat adapted for use with an automobile seat, comprising a backrest, head rest means in combination with said backrest and extending upwardly therefrom, a seat hingedly attached at its rear edge to the lower part of said backrest, a tongue formed in the forward part of said seat, arcuate means cut out in the sides of said seating defining said tongue and providing leg-receiving spaces alongside said tongue, flexible strap means connected at the lower end thereof to the forward end of said tongue intermediate said cut outs, plate means carried by the upper end of said strap means, said plate means being slotted with an upwardly reducing slot providing latch means, a shaft carried by the rear of said backrest, guard means pivoted to said shaft and extending forwardly from the opposite sides of the backrest overlying said tongue, said guard means provided with a stud substantially at the center thereof in approximate vertical alinement with said strap means for latching engagement with said latch means of the said plate means to retain said guard against upward movement, spring urged perforate means surrounding the said stud causing said stud to bear against the said plate means, limit means attached to the sides of said backrest underlying said guard member to maintain the position of said guard means against downward movement, hook-like hanger means connected to said backrest overlying said automobile seat, bar means interconnecting said hanger means rearward of said automobile seat to maintain spacial alinement between said hook-like hanger means, belt means connected to the forward part of said child's seat to secure the user thereof in said child's seat, anchor means comprising a substantially Y-shaped harness having its legs respectively connected to said hook-like hanger means at the lower end thereof rearwardly of said automobile seat, and means connecting said harness to the body of an automobile for preventing accidental separation of said child's seat from said automobile seat in the event of overturn of the said automobile.

References Cited by the Examiner

UNITED STATES PATENTS

| | | | |
|---|---|---|---|
| 930,839 | 8/1909 | Cleary | 297—390 |
| 988,558 | 4/1911 | England | 24—224 |
| 2,640,246 | 6/1953 | Shomber | 24—224 |
| 2,690,787 | 10/1954 | Soltis | 297—255 |
| 3,132,896 | 5/1964 | Hamilton | 297—256 |
| 3,166,355 | 1/1965 | Rocker | 297—256 |

FOREIGN PATENTS

| | | |
|---|---|---|
| 876,586 | 5/1953 | Germany. |
| 787,461 | 12/1957 | Great Britain. |

References Cited by the Applicant

UNITED STATES PATENTS

| | | |
|---|---|---|
| 2,508,822 | 5/1950 | Goldberg. |
| 2,774,411 | 12/1956 | Berlin. |
| 2,806,511 | 9/1957 | Merelis. |

FRANCIS K. ZUGEL, *Primary Examiner.*

FRANK B. SHERRY, *Examiner.*